Sept. 24, 1957
F. FISCHER ET AL
2,807,687
JEWELED ELECTRIC RELAY
Filed June 13, 1955
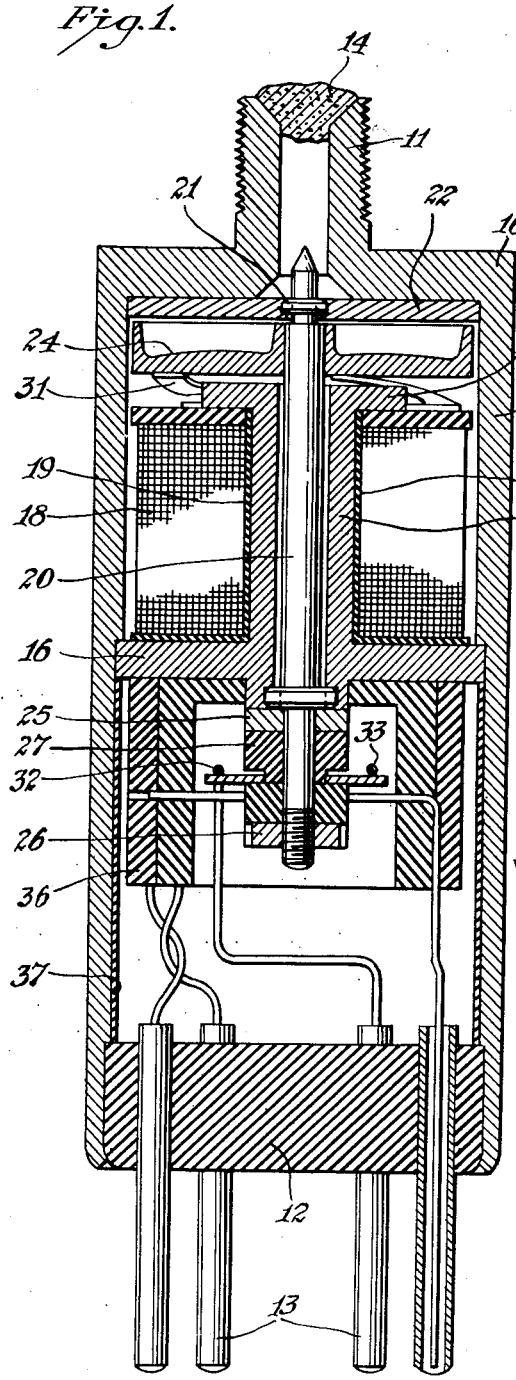
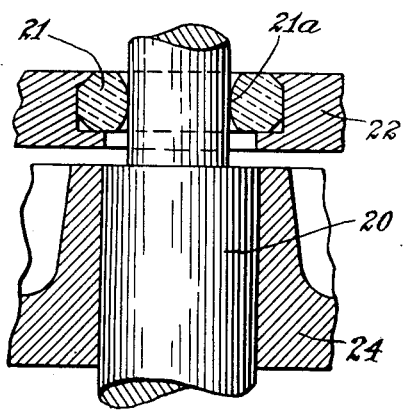
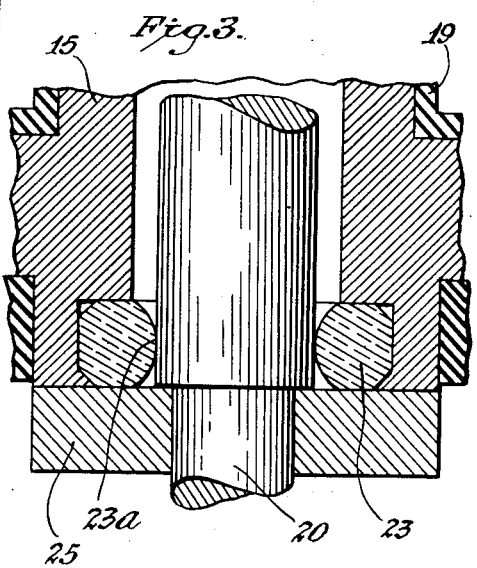
FRANZ FISCHER
CARL PUNZMANN
INVENTORS.
BY Kenyon & Kenyon
ATTORNEYS.

United States Patent Office 2,807,687
Patented Sept. 24, 1957

2,807,687

JEWELED ELECTRIC RELAY

Franz Fischer, Jackson Heights, and Carl Punzmann, Rego Park, N. Y., assignors to Bulova Research and Development Laboratories, Inc., Flushing, N. Y., a corporation of New York Application June 13, 1955, Serial No. 514,953

3 Claims. (Cl. 200—87)

The present invention relates generally to electromagnetic devices and more particularly to an improved electromagnetic relay structure provided with a contact-actuating plunger which is supported in jeweled bearings and is subjected to both axial and rotational forces.

In the design of relays of exceptionally small size adapted to operate in situations where available operating powers are of limited magnitude and intended to function for protracted periods without maintenance, the mechanical tolerances of the relay components necessarily are relatively severe. Thus, in a sensitive relay of sub-miniature size, such as the type disclosed in the copending application Serial No. 471,238, filed November 26, 1954, wherein the relay includes a contact-actuating plunger, unless the position of the plunger is maintained so that it moves in an axial path without deviation therefrom, the operation of the relay will be erratic and unreliable. Moreover, even though the plunger is supported in sliding bearings of metallic construction which are designed to maintain the desired alignment, with continued operation of the relay the resultant wear of the bearings gives rise to lateral play therein which impairs the relay operation. Where the relay is intended to undergo a million or more contact strokes without maintenance or additional lubrication, the wear of the bearings is a limiting factor in the life of the relay.

The quality required of the bearing is that it shall allow the member supported therein perfect freedom for one direction of motion such as sliding and rotation in one axis, at the same time preventing it from performing any other form of motion. The contacting surfaces between the moving and stationary members offer more or less resistance depending upon the material used and the smoothness of the surfaces.

When a shaft rotates in a bearing, the area on the shaft exposed to friction is equal to the area in the bearing, inasmuch as these two areas are coincident and always remain in contact relation. When, however, the moving element takes the form of a plunger, such as is disclosed in the above-identified copending application, which plunger simultaneously undergoes axial movement and rotary motion, the prevailing conditions are distinctly different. The reason for this lies in the disparity between the active area of the plunger and the active area of the bearing, for a considerable length of the plunger may come into contact with the bearing in the course of an operating stroke. Assuming that the wearing properties of the plunger and the bearing are about the same, the wear of the small area of the bearing is far greater than that of the larger active plunger surface.

Furthermore, a large portion of the plunger at any given moment is not covered by the bearing and may collect dust and grit which will aggravate wear of the bearing. Hence, while it is possible for a steel shaft to rotate in an aperture in a brass plate with entirely satisfactory results, the same is not true for an axially-shiftable plunger. The wearing effects of the plunger on the bearing are further accentuated if the plunger also undergoes a rotational movement as it slides axially in the bearing.

When the relay is expected to operate for a prolonged period without maintenance, the bearings for the plunger generally lose whatever lubricant had originally been supplied thereto. Thus where the sensitivity of the relay is an important factor, the starting friction of a conventional un-lubricated bearing militates against the efficient operation of a relay.

In view of the foregoing it is the principal object of the present invention to provide a relay of exceptionally compact size which will function reliably and for prolonged periods in situations where available operating voltages or currents are materially limited.

More particularly it is an object of the invention to provide a sturdy and efficient relay structure wherein the switching contacts thereof are actuated by an armature-operated plunger which is axially supported in jeweled bearings. A significant feature of the invention resides in the fact that the jeweled bearings prevent lateral play of the plunger even after prolonged use, and that the starting friction of the relay is minimized even when the bearings are dry.

For a better understanding of the invention, as well as further objects and features thereof, reference is made to the following detailed description to be read in connection with the accompanying drawings, wherein like components in the several views are identified by like reference numerals.

In the drawing:

Fig. 1 is a perspective view of an assembled electromagnetic relay embodying the present invention.

Fig. 2 is an enlarged cross-sectional view of the upper bearing of the relay shown in Fig. 1.

Fig. 3 is an enlarged cross-sectional view of the lower bearing of the relay.

Referring now to the drawings, there is shown an electromagnetic relay in accordance with the invention comprising a cylindrical outer casing 10, formed of magnetizable material, such as soft iron. The casing is closed at the upper end by a closure disc 10a integral therewith. The closure is provided with a tubular cap 11 formed centrally thereon, which is externally threaded. The lower end of casing 10 is enclosed by a cylindrical insulating base 12 having a plurality of terminal prongs 13 embedded therein and extending therefrom. The tubular cap 11 is sealed by a fusible plug 14 of tin or similar material through which a small hole has been drilled for the purpose of evacuating the casing and thereafter filling the relay with an inert gas under pressure. The externally threaded cap facilitates the union of the relay casing to a vacuum pump or to a container of compressed gas, and when the relay is filled the fusible plug may be sealed off by heat. The insulating base 12 is held in the casing 10 with a tight fit and rests against a suitable shoulder formed in the internal wall of the casing. The base may be secured in place by spinning over the lower end of the casing, or by the use of a suitable cement.

Concentrically disposed within the cylindrical casing 10 is a hollow magnetizable core 15 of ferromagnetic material, such as soft iron. The core is supported within the upper section of casing 10 by means of disc-shaped flange 16 extending outwardly from the lower end of the core and abutting a shoulder formed in the internal wall of the casing, whereby the core and casing are magnetically associated. The upper end of core 15 is provided with a circular flange 17 constituting one pole piece of the magnetic circuit, the opposing pole piece thereof being defined by the closure 10a of the casing 10 which is magnetically connected to the lower flange 16 of the core.

Surrounding core 15 is a solenoid 18 which is wound about an insulating spool 19. Extending through the longitudinal bore in core 15 is a plunger shaft 20. The upper end of shaft 20 is journaled in a jeweled sliding-bearing 21 which is coaxially set into a non-magnetic circular plate 22, mounted against the closure 10a of the casing, and preferably made of brass. The lower end of shaft 20 is journaled in a jeweled sliding-bearing 23 coaxially set into the lower end of core 15. Thus, the plunger shaft 20 is slideable axially in the core and is also free to rotate. The details of bearings 21 and 23 will be later described in connection with Figs. 2 and 3.

Secured centrally to the upper end of shaft 20 and operative within the air gap defined between pole piece 17 and closure 10a is an armature 24. Armature 24 is disc-shaped, the underside thereof being flat, the upper portion thereof being hollowed out to reduce the weight of the armature. The diameter of armature 24 is slightly less than that of casing 10, hence it is important that the axial position of the plunger be maintained without lateral deviation.

Attached to the lower end of shaft 20 is a bridging contact assembly consisting of two non-magnetic metallic rings 25 and 26, preferably of brass, between which are tightly clamped two collars 27 and 28 formed of insulating material. An annular recess 29 is cut into the lower end of the upper collar 27 in order somewhat loosely to accommodate a disc-shaped bridging contact element 30, fabricated of silver or any other highly conductive metal suitable for use as a switching contact. The small amount of play allowed contact element 30 in the annular recess 29 affords sufficient freedom to permit rotation or tilting thereof through a small angle.

Surrounding pole piece 17 and resting on the upper cheek of the insulating spool 19 is a spring member 31, which is formed by a ring of flat, resilient metal having three equally spaced fingers. The fingers extend upwardly to engage the flat underside of armature 24. The spring member may be fabricated from the flat metal by cutting radial and arcuate slots therein at points spaced at 120° from each other and then bending the resultant fingers upwardly.

When the solenoid 18 is excited by an applied voltage, armature 24 is drawn downwardly against the pressure of the spring fingers. The downward movement of armature 24 is transmitted by plunger shaft 20 to the bridging contact element 30. The de-energization of the solenoid results in the upward movement of the armature, the armature being lifted by the action of the spring fingers. The underside of armature 24 is planar and normal to the vertical axis of plunger shaft 20, whereas the spring fingers, when fully raised, occupy an oblique angle relative to the surface of the armature. Hence, upon energization of the relay, as the armature is brought to bear against the spring fingers it tends to rotate as well as to shift in the axial direction. This complex movement is transmitted to bridging contact 30.

Two pairs of fixed contacts are provided, one pair being disposed above and the other below bridging contact 30. The upper pair is constituted by wires 32 and 33, and the under pair by two wires, only wire 34 being visible in the drawing. The fixed contact wires are supported transversely in a tubular insulation block 36, which depends from the lower end of core 15 and coaxially surrounds the bridging contact assembly. The lower contact wires extend in parallel paths in a common plane on either side of insulation collar 26, the wires being suitably spaced to clear the collar. Similarly, the upper wires 32 and 33 extend in parallel paths perpendicular to the lower wires and on either side of insulation collar 27. The position of the upper wires is such as to engage the movable bridging element 30 at the rest position of the element when the relay is deenergized. The position of the lower wires is such that when the relay is onergized they are engaged by bridging element 30 in the downward or operative position.

Each contact wire is provided with an integral extension which passes longitudinally through the wall of insulation block 36 and terminates in a respective pin or prong 13, to which it is soldered. If desired, the terminal prongs 13 may be eliminated entirely and the contact wire extensions brought directly out of insulation base 12 for connection to an external circuit. In a similar fashion the leads from solenoid 18 may be connected to suitable prongs or brought out directly to the base. Casing 10 is provided with an internal insulating liner 37 which extends from the underside of flange 16 to base 12 and acts to protect the switching circuit and to prevent the axial displacement of core 15.

In operation, when the relay is energized, contact element 30 is caused to engage the lower fixed contact wires, the contact element 30 tilting to an extent which will accommodate the surface thereof to that of the fixed contacts. Thus, the position of the fixed contacts is by no means critical, and small changes therein which might occur with continued use of the relay will in no way preclude an effective electrical connection. Tilting of the contact element 32 will also occur when it is released to engage the upper fixed contact wires. Furthermore, inasmuch as element 30 is displaced angularly by reason of the action of the spring fingers, each time the relay is energized a different area of the contact element will be brought into engagement with the fixed contacts, thus distributing the wear on the bridging contact and substantially lengthening the effective life thereof.

It is important to note that there are no soldered or screw joints for electrical connection to the fixed contacts, nor are there flexible leads connected to the movable contact. An electrical connection is completed between the wires in a given pair of fixed contacts when they are bridged and interconnected by the movable contact 30. It will also be appreciated that the magnetizable casing 10 serves not only to shield the mechanism of the relay from external fields, but also functions as a return path from the magnetic circuit.

As pointed out hereinabove, plunger 20 undergoes both an axial and a rotational movement on the downward stroke when subjected simultaneously to the axial forces supplied by the electromagnet and the angular forces supplied by the spring. To maintain the axial position of the plunger and yet minimize friction, the bearings 21 and 23 as shown separately in Figs. 2 and 3 are each constituted by an annular element formed of precious or synthetic stone, such as sapphire, having central apertures 21a and 23a, respectively, which are drilled or otherwise formed to provide rounded or "olive" holes in which the plunger is journaled at either end thereof. The surface of the bearing holes is highly polished. The rounded hole reduces the surface of the bearing wall in contact with the plunger and as this surface is highly polished, friction is substantially reduced even in the absence of lubrication. The upper and lower edges of the bearings are preferably champfered.

While there has been shown what at present is considered to be a preferred embodiment of the invention, it will be manifest that many changes and modifications may be made therein without departing from the essential concept underlying the invention. It is intended, therefore, in the annexed claims to cover all such changes and modifications that fall within the true scope of the invention.

What is claimed is:

1. An electromagnetic relay comprising a hollow magnetizable core, a solenoid surrounding said core, a plunger extending through said core and slideable therein, an armature mounted at one end of said plunger in operative relation to said core, said armature effecting axial movement of said plunger upon energization of said solenoid, a movable contact element supported on the other end of said plunger, a fixed contact element cooperatively positioned relative to said movable contact element, jeweled sliding bearings disposed at either end of said plunger above and below said solenoid to support said plunger and to prevent axial play thereof, and a spring interposed between said solenoid and said armature for imparting a rotational movement to said armature upon axial displacement thereof, said bearings each being constituted by an annular stone having an olive hole minimizing the surface area in contact with the plunger, said spring including circumferentially arranged upwardly extending resilient fingers engaging the underside of said armature frictionally to apply a torque thereto when said fingers are compressed upon energization of said solenoid.

2. An electromagnetic relay comprising a cylindrical casing of magnetizable material, a tubular core concentrically mounted within said casing and having adjacent the lower end thereof an outwardly extending flange abutting the internal wall of said casing to effect a magnetic connection therewith, a solenoid surrounding said core, a plunger extending through said core, a first jeweled sliding bearing inserted in the lower end of said core to support said plunger, an armature mounted adjacent the upper end of said plunger, a second jeweled sliding bearing disposed above said armature, the upper end of said plunger being journaled therein, said armature effecting axial movement of said plunger upon energization of said solenoid, a movable contact element supported on the lower end of said plunger, a fixed contact element cooperatively positioned relative to said movable contact element, and a spring interposed between the upper end of said solenoid and the underside of said armature to impart a rotational movement thereto when said plunger is displaced axially, said bearings each being constituted by an annular stone having an olive hole minimizing the surface area in contact with the plunger, said spring including circumferentially arranged upwardly extending resilient fingers engaging the underside of said armature frictionally to apply a torque thereto when said fingers are compressed upon energization of said solenoid.

3. An electromagnetic relay comprising a cylindrical casing of magnetizable material, the upper end of said casing being closed and terminating in a tubular cap adapted for evacuation of said casing, a tubular core concentrically mounted within said casing and having adjacent the lower end thereof an outwardly extending flange abutting the internal wall of said casing to effect a magnetic connection therewith, said core having a second flange at the upper end thereof constituting a pole piece, a solenoid surrounding said core, a plunger extending through said core and slideable therein, an armature mounted adjacent the upper end of said plunger, said armature having a flat underside, said armature effecting axial movement of said plunger upon energization of said solenoid, a non-magnetic disc disposed against the inner face of the upper end of said casing, a jeweled sliding bearing coaxially secured to said disc, the upper end of said plunger being journaled thereon, a jeweled sliding bearing secured in the lower end of said core to support said plunger, a tiltable movable contact element supported on the lower end of said armature, a fixed contact element cooperatively positioned relative to said movable contact element, a spring interposed between the upper end of said solenoid and the underside of said armature to impart a rotational movement thereto when said armature is displaced axially, and an insulating block enclosing the other end of said casing and provided with terminal prongs, said bearings each being constituted by an annular stone having an olive hole minimizing the surface area in contact with the plunger, said spring including circumferentially arranged upwardly extending resilient fingers engaging the underside of said armature frictionally to apply a torque thereto when said fingers are compressed upon energization of said solenoid.

References Cited in the file of this patent

UNITED STATES PATENTS

| 1,418,427 | Brun | June 6, 1922 |
| 1,476,013 | Holtz | Dec. 4, 1923 |
| 1,700,314 | Hartwig | Jan. 29, 1929 |
| 1,817,155 | Leece | Aug. 4, 1931 |
| 2,323,702 | Berkey | July 6, 1943 |
| 2,539,547 | Mossman et al. | Jan. 30, 1951 |

FOREIGN PATENTS

| 306,337 | Great Britain | Feb. 21, 1929 |
| 334,555 | Italy | Jan. 27, 1936 |